(12) United States Patent
Plummer et al.

(10) Patent No.: US 11,285,641 B2
(45) Date of Patent: Mar. 29, 2022

(54) METHODS AND SYSTEMS FOR FORMING CURVED COMPOSITE CHARGES FOR STRINGERS

(71) Applicant: The Boeing Company, Chicago, IL (US)

(72) Inventors: Steven J. Plummer, Tukwila, WA (US); Kurtis S. Willden, Kent, WA (US); Raviendra S. Suriyaarachchi, Kirkland, WA (US); Paul D. Shaw, Mt. Pleasant, SC (US); James R. Kendall, Mt. Pleasant, SC (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 16/802,297

(22) Filed: Feb. 26, 2020

(65) Prior Publication Data
US 2021/0260795 A1    Aug. 26, 2021

(51) Int. Cl.
*B29C 33/00* (2006.01)
*B29C 70/00* (2006.01)
(Continued)

(52) U.S. Cl.
CPC .......... *B29C 33/505* (2013.01); *B29C 33/308* (2013.01); *B29C 70/446* (2013.01); *B29L 2031/3076* (2013.01); *B64C 1/064* (2013.01)

(58) Field of Classification Search
CPC ....... B29C 33/00; B29C 33/30; B29C 33/308; B29C 33/50; B29C 33/505; B29C 70/00; B29C 70/40; B29C 70/44; B29C 70/446
See application file for complete search history.

(56) References Cited

U.S. PATENT DOCUMENTS

| 4,720,255 A | 1/1988 | Mittelstadt |
| 9,561,602 B2 * | 2/2017 | Jones .................... B29C 33/307 |

(Continued)

OTHER PUBLICATIONS

Rotter, Daniel; Contoured Composite Stringers, U.S. Appl. No. 16/252,260, filed Jan. 18, 2019.
(Continued)

*Primary Examiner* — Jacob T Minskey
*Assistant Examiner* — Matthew Hoover
(74) *Attorney, Agent, or Firm* — Kwan & Olynick LLP

(57) ABSTRACT

Described are methods and systems for manufacturing curved composite stringers. Such composite stringers may have in-plane and/or out-of-plane bends, which are formed while shaping composite charges. Specifically, a composite charge is shaped using a pallet, comprising a plurality of independent pallet portions, rotatably coupled to each other. A hat portion is formed when a part of this charge is conformed to a cavity in the pallet. The pallet portions are rotated relative to each other while forming the hat portion and/or when the hat portion already conforms to the cavity. In some examples, the die is bent together with the charge, when the pallet portions are rotated. This rotation produces one or more of in-plane and/or out-of-plane bends. In some examples, flange portions of the composite charge are positioned in a temporary orientation, e.g., to enable bending of the charge and reduce wrinkles.

20 Claims, 13 Drawing Sheets

(51) Int. Cl.
*B29C 33/50* (2006.01)
*B29C 33/30* (2006.01)
*B29C 70/44* (2006.01)
B29L 31/30 (2006.01)
B64C 1/06 (2006.01)

(56) References Cited

U.S. PATENT DOCUMENTS

| 2014/0203477 | A1* | 7/2014 | Chapman | B29C 70/462 |
| | | | | 264/296 |
| 2016/0023409 | A1* | 1/2016 | Coxon | B29C 70/541 |
| | | | | 425/167 |
| 2019/0176410 | A1 | 6/2019 | Register | |
| 2020/0231267 | A1 | 7/2020 | Rotter et al. | |

OTHER PUBLICATIONS

European Application Serial No. 21158047.7, Search Report dated Jul. 8, 2021, 7 pgs.

\* cited by examiner

METHODS AND SYSTEMS FOR FORMING CURVED COMPOSITE CHARGES FOR STRINGERS

BACKGROUND

Aircraft designs utilize various components, such as stringers, to support bending, torsional, shear, and direct loads. Stringers are typically formed from lightweight composites, e.g., tapes or fabrics with fibers embedded into resins. A composite layup is typically processed in a forming tool to define the final or semi-final shape of the stringer. However, many applications (e.g., aircraft) require a large number of stringers having different shapes and, in particular, different bends and turns along the length of these stringers. Having a dedicated forming tool for each stringer type creates logistics problems and greatly increases manufacturing costs. Furthermore, forming bends using conventional forming techniques and tools, such as two-stage shaping and bending, may result in wrinkles, which are not desirable.

More specifically, composite stringers are typically fabricated using a multi-stage process. First, in conventional processes, a hat portion of a stringer is shaped using a combination of a die and a cavity in a pallet. At this stage, the stringer is straight, e.g., not having any bends along the stringer length, such as bends around axes perpendicular to the principal axis of the stringer. If any bends, such as in-plane and/or out-of-plane bends, are needed, then the shaped stringer is transferred to another tool, where the stringer is bent into the final stringer shape. Typically, not all surfaces of the shaped stringer are supported during this separate bending operation. This post-shaped bending operation can cause wrinkles, which are not desirable.

What is needed are new methods and devices for forming curved composite charges for stringers.

SUMMARY

Described are methods and systems for forming curved composite charges for stringers. Such composite stringers may have in-plane and/or out-of-plane bends, which are formed while shaping composite charges. Specifically, a composite charge is shaped using a pallet, comprising a plurality of independent pallet portions, rotatably coupled to each other. A hat portion is formed when a part of this charge is conformed to a cavity in the pallet. The pallet portions are rotated relative to each other while forming the hat portion and/or when the hat portion already conforms to the cavity. In some examples, the die is bent together with the charge, when the pallet portions are rotated. This rotation produces one or more of in-plane and/or out-of-plane bends. In some examples, flange portions of the composite charge are positioned in a temporary orientation, e.g., to enable bending of the charge and reduce wrinkles.

In some examples, a method for forming a curved composite charge is provided, The method comprises positioning a composite charge on a processing surface of a pallet and over a cavity of the pallet. The composite charge comprises a hat portion and flange portions, monolithic with and interconnected by the hat portion. The pallet comprises a plurality of pallet portions, wherein each pallet portion of the plurality of pallet portions is rotatably coupled to at least one other pallet portion of the plurality of pallet portions. The cavity extends through each pallet portion of the plurality of pallet portions. The composite charge is positioned over and contacts, each pallet portion of the plurality of pallet portions. The method comprises contacting the hat portion of the composite charge with a die such that the die is aligned with the cavity. The cavity is defined by a cavity surface. The method also comprises folding at least the hat portion to conform to the die, inserting the die into the cavity such that the hat portion is positioned between the die and the cavity surface and conforms to each of the die and the cavity surface, and rotating two or more pallet portions of the plurality of pallet portions relative to each other around one or more axes, thereby forming a curved composite charge.

In some examples, a method comprises inserting a die and a composite charge into a cavity of a pallet. The pallet comprises a plurality of pallet portions, rotatably coupled to each other. The method comprises rotating two or more pallet portions of the plurality of pallet portions relative to each other around one or more axes, thereby forming a curved composite charge from the composite charge.

In some examples, a stringer forming device comprises a pallet, comprising a plurality of pallet portions. Each pallet portion of the plurality of pallet portions is rotatably coupled to at least one other pallet portion of the plurality of pallet portions. The pallet further comprises a processing surface and a cavity, extending away from the processing surface and into the pallet. The stringer forming device comprises a die, aligned with the cavity and having a cross-section corresponding to a cross-section of the cavity. The die is movable relative to the pallet in a direction, perpendicular to the processing surface of the pallet.

DETAILED DESCRIPTION

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Described herein are methods and systems that provide in-plane and/or out-of-plane bending capabilities during the stringer shaping operation. This novel approach allows reducing the risk of wrinkles and increasing the overall process throughput by combining multiple processing stages (e.g., shaping and post-shaped bending) into one, which may be collectively referred to as a stringer forming operation. This approach also provides support to stringer surfaces while performing bending, since the bending operation is performed using the same shaping equipment, e.g., a stringer forming device. Furthermore, various sequences of shaping and bending operations are specifically selected based on the final shape of the stringer and properties of composite charges. For example, if a stringer has a significant in-plane bend, then, in some examples, this bend is formed after forming the hat portion, but before finally orienting the flange portions, e.g., relative to the hat portion.

Specifically, a composite charge is shaped using a pallet, comprising a plurality of pallet portions, rotatably coupled to each other. A hat portion is formed, when a part of the charge is conformed to a cavity in the pallet. Pallet portions are rotated relative to each while forming the hat portion or soon thereafter, e.g., when the hat portion is already formed and conforms to the cavity. In some examples, the die bends together with the shaped charge while forcing the hat portion of against the cavity surface. This rotation of the pallet portions produces one or more of in-plane and/or out-of-plane bends. In some examples, flange portions of the composite charge are positioned into a temporary orientation, e.g., away from the pallet to enable bending of the charge and to reduce wrinkles.

Figure 1A:
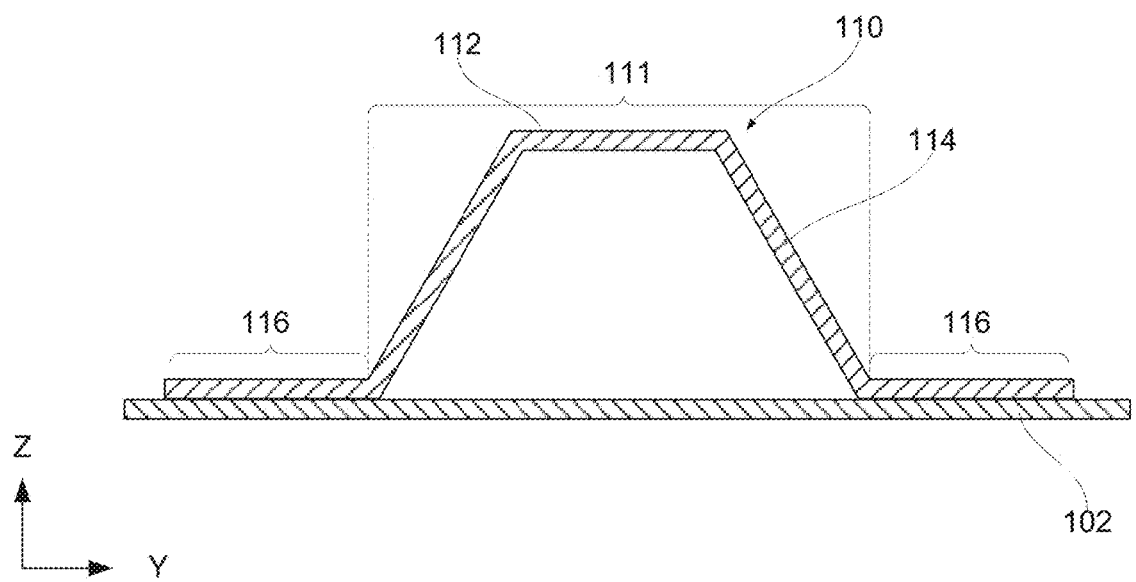
FIGS. 1A-1E are schematic cross-sectional views of different examples of a stringer, positioned over and in contact with a base structure.
Figure 1B:
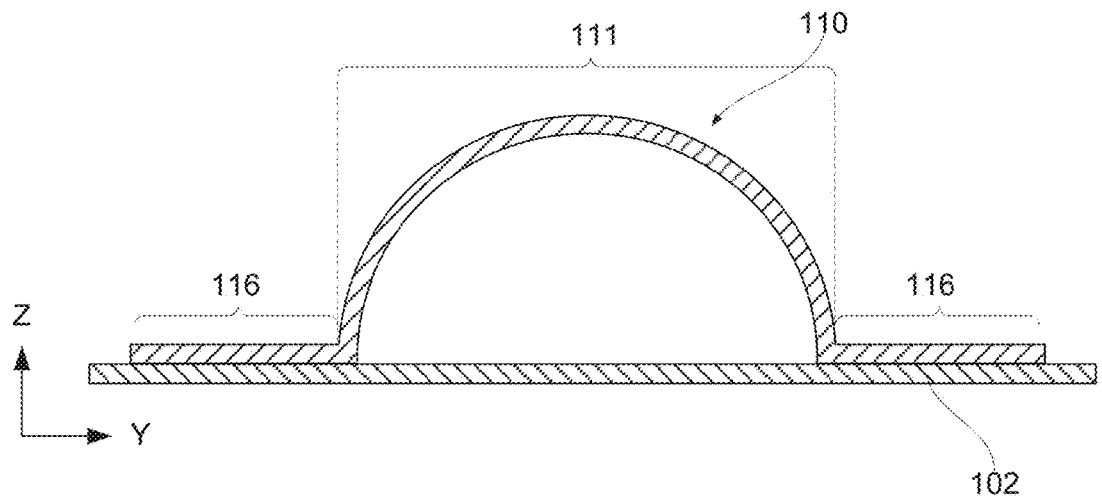

Any types of composite stringers are with the scope of this disclosure, some of which will now be described with reference to FIGS. 1A-1G. FIG. 1A is a schematic cross-sectional view of stringer 110, which has a trapezoid cross-section. Specifically, stringer 110 comprises hat 111 and two flanges 116, one on each side of hat 111. In this example, hat 111 is shaped as a trapezoid and comprises cap 112 and two side walls 114. In some examples, cap 112 is parallel to flanges 116. However, other examples are also within the scope. Flanges 116 are used for attaching stringer 110 to base structure 102, e.g., a fuselage skin of an aircraft, FIG. 16 is a schematic cross-sectional view of a stringer 110, which has a semi-circular cross-section. In this example, hat 111 is formed by one continuous arc. Various shapes of this arc are also within this shape, e.g., arcs with a continuous radius, arcs with variable radius. Similar to an example in FIG. 1A, flanges 116 are used for attaching stringer 110 to base structure 102.

Figure 1C:
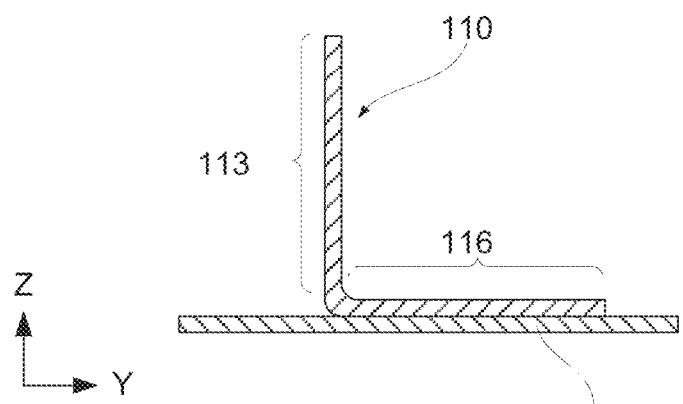

FIG. 1C is a schematic cross-sectional view of a stringer 110, which has an L-shaped profile. Specifically, stringer 110 comprises flange 116 and extension 113, which forms 90° relative to flange 116. However, other orientations of extension 113 relative to flange 116 are also within the scope, e.g., different angles. Similar to the previous examples, flange 116 is used for attaching stringer 110 to base structure 102.

Figure 1D:
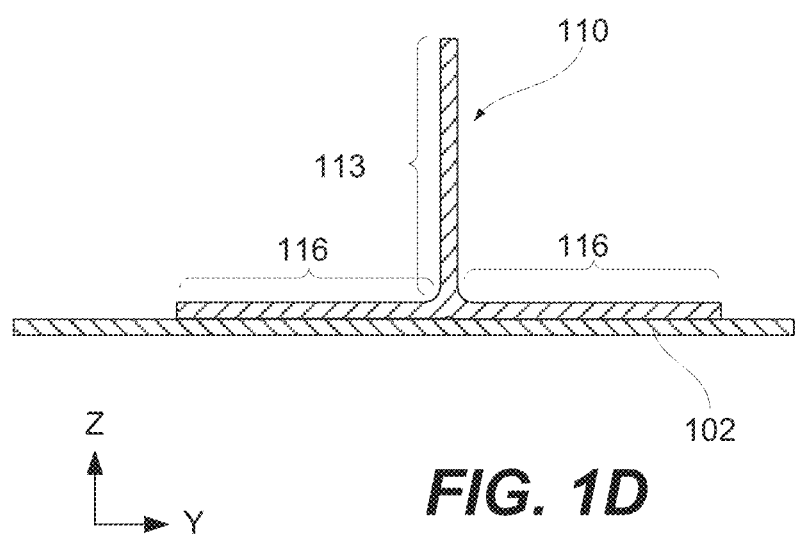

FIG. 1D is a schematic cross-sectional view of a stringer 110 having a T-shaped profile. Specifically, stringer 110 comprises two flanges 116 and extension 113, which forms 90° relative to flanges 116. Extension 113 is positioned between two flanges 116. However, other orientations are within the scope.

Figure 1E:
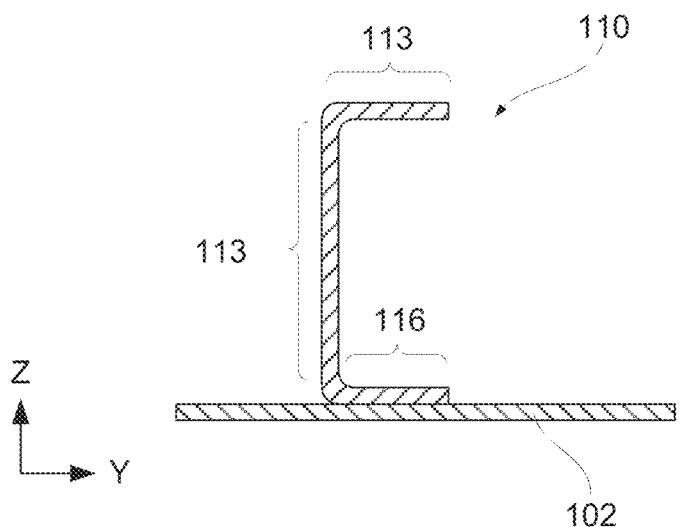

FIG. 1E is a schematic cross-sectional view of a stringer 110 having a C-shaped profile. Specifically, stringer 110 comprises flange 116 and two extensions 113. One of these extensions forms 90° relative to flange 116, while another one is parallel to flange 116.

Figure 1F:
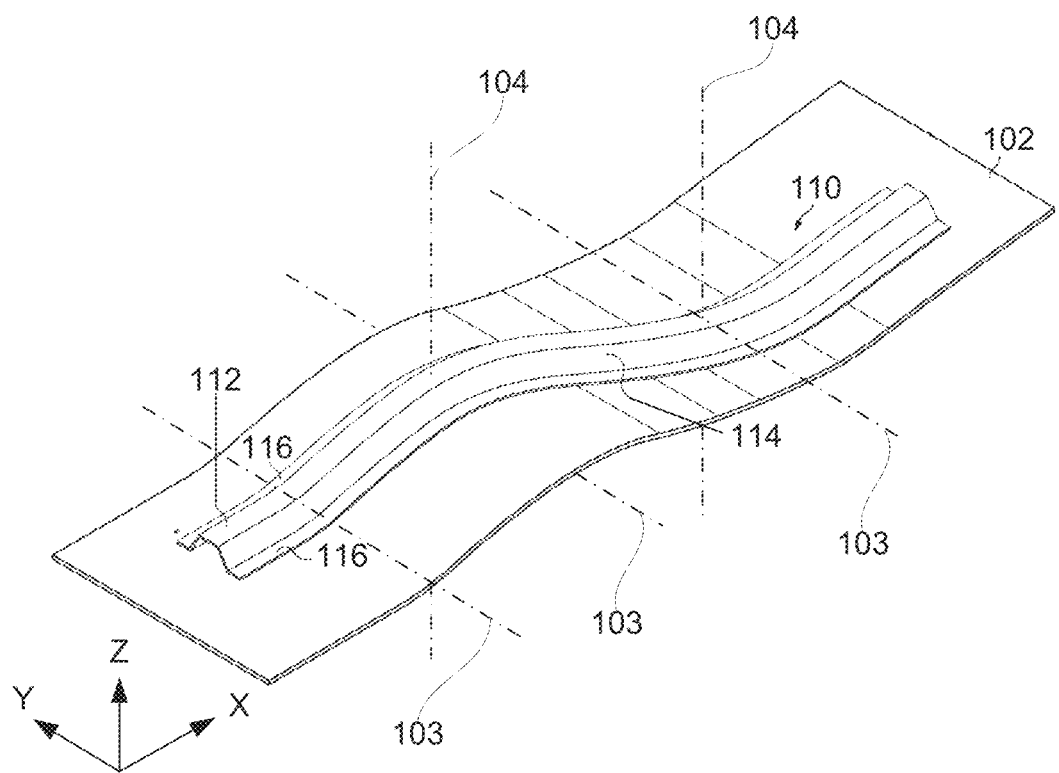
FIG. 1F is a schematic perspective view of the stringer in FIG. 1A, illustrating in-plane and out-of-plane bends, in accordance with some examples of the present disclosure.
Figure 1G:
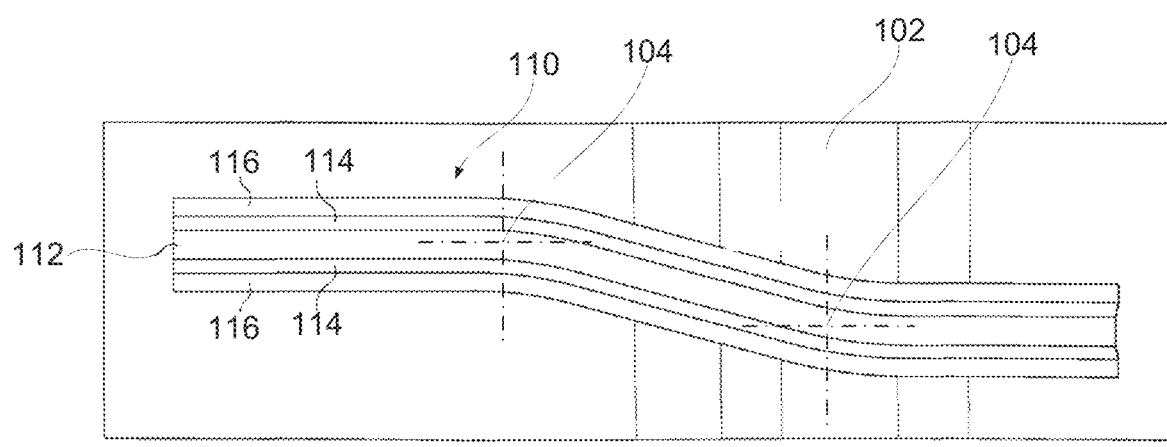
FIG. 1G is a schematic top view of the stringer in FIGS. 1A and 1F, further illustrating the in-plane bend, in accordance with some examples of the present disclosure.

FIGS. 1F and 1G are schematic perspective and top views of stringer 110 in FIG. 1A. Specifically, FIG. 1F illustrates three out-of-plane bends of stringer 110, around axes 103, which are parallel to Y axis. Notably, these axes 103 are also parallel to flanges 116 of stringer 110. FIG. 1G illustrates two in-of-plane bends of stringer 110, around axes 104, which are parallel to Z axis. Notably, these axes 104 are also perpendicular to flanges 116 of stringer 110.

Examples of Stringer Forming Devices

Figure 4A:
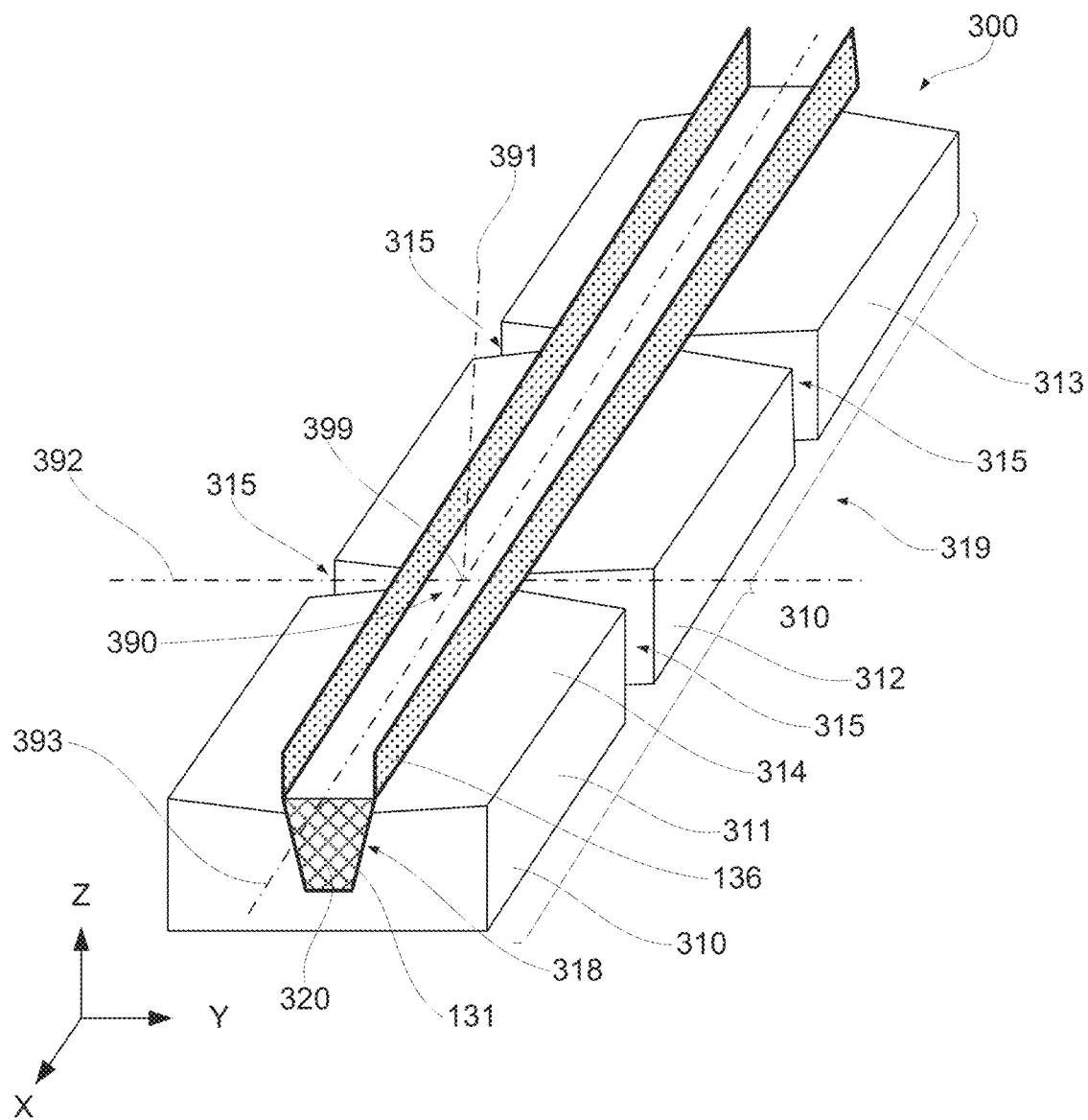
FIG. 4A is a schematic perspective view of a die and a pallet, comprising a plurality of pallet portions, rotatably coupled to each other, in accordance with some examples of the present disclosure.

Referring to FIG. 4A, stringer forming device 300 comprises pallet 310 and die 320. Pallet 310 further comprises processing surface 314 and cavity 318, extending away from processing surface 314 and into pallet 310. FIG. 4A illustrates die 320 and hat portion 131 of composite charge 130 positioned within cavity 318. A combination of die 320 and cavity 318 is used for shaping hat portion 131. More specifically, die 320 is aligned with cavity 318 along the Z axis. Die 320 is also movable relative to pallet 310 in the direction along the Z axis, which is perpendicular to processing surface 314 of pallet 310. Furthermore, die 320 has a cross-section corresponding to a cross-section of cavity 318. In some examples, the cross-section of die 320 has the same shape but smaller than the cross-section of cavity 318 to accommodate hat portion 131 of composite charge 130. The size difference between die 320 and cavity 318 is determined by the thickness of composite charge 130.

Pallet 310 comprises plurality of pallet portions 319, which are rotatably coupled to each other. For example, FIG. 4A illustrates plurality of pallet portions 319, comprising first pallet portion 311, second pallet portion 312, and third pallet portion 313. Second pallet portion 312 is rotatably coupled to each pallet portion of first pallet portion 311 and third pallet portion 313. More specifically, FIG. 4A illustrates pivot point 399 between first pallet portion 311 and second pallet portion 312. In some examples, first pallet portion 311 is rotatable relative to second pallet portion 312 around first axis 391, which is perpendicular to processing surface 314 of pallet 310. First axis 391 is parallel to the Z-axis. This type of rotation is referred to as an in-plane bending. In the same or other examples, first pallet portion 311 is rotatable relative to second pallet portion 312 around second axis 392, which is parallel to processing surface 314 of pallet 310. This type of rotation is referred to as an out-of-plane bending. Second axis 392 is perpendicular to the principal axis of stringer forming device 300, which extends along cavity 318. Second axis 392 is also parallel to the Y axis. FIG. 4A also illustrates third axis 393, which is parallel to the X axis. In some examples, third axis 393 is a principal axis of stringer forming device 300 or at least parallel to the principal axis.

In some examples, plurality of pallet portions 319 comprises pallet rotation openings 315, e.g., positioned between each pair of adjacent pallets, as shown in FIG. 4A. Pallet rotation openings 315 allow plurality of pallet portions 319 to rotate relative to each other (e.g., in plane and/or out of plane) without distorting the structure of plurality of pallet portions 319, e.g., bending individual pallets. In some examples, plurality of pallet portions 319 are formed from a bendable material providing additional flexibility to plurality of pallet portions 319, e.g., in addition to pallet rotation openings 315.

In some examples, die 320 is bendable, e.g., when die 320 is inserted into cavity 318 and when plurality of pallet portions 319 rotate relative to each other. This feature provides support to hat portion 131 of composite charge 130 while rotating plurality of pallet portions 319 thereby reducing the risk of wrinkle.

Figure 5A:
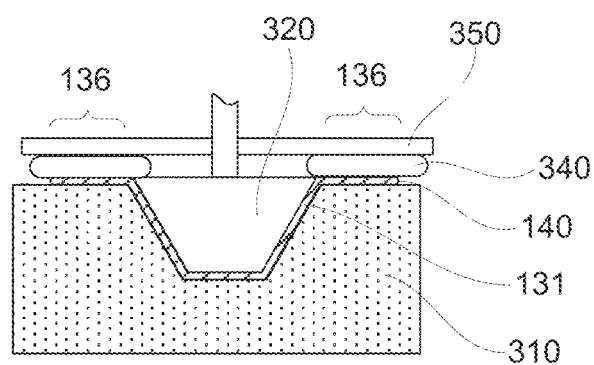
FIG. 5A is a schematic cross-sectional view showing flange portions of the charge conforming positioned against the processing surface of the pallet, in accordance with some examples of the present disclosure.
Figure 5B:
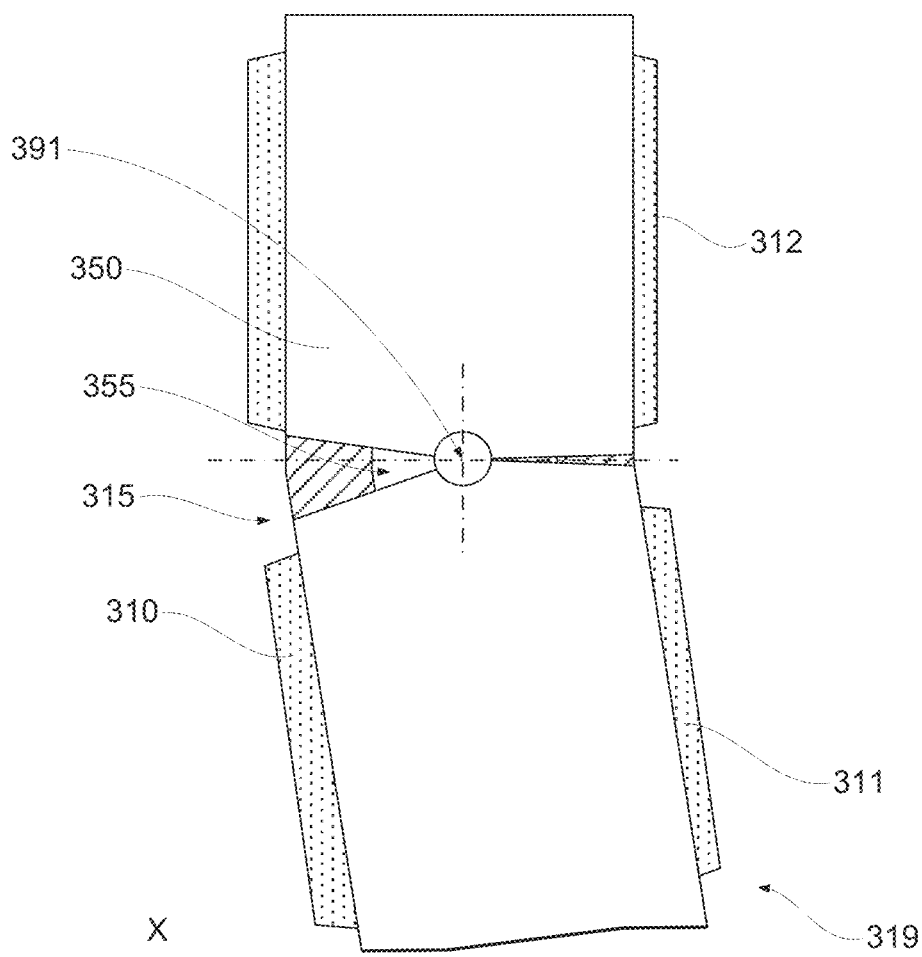
FIG. 5B is a schematic top view showing flange portions of the charge conforming positioned against the processing surface of the pallet, in accordance with some examples of the present disclosure.
Figure 5C:
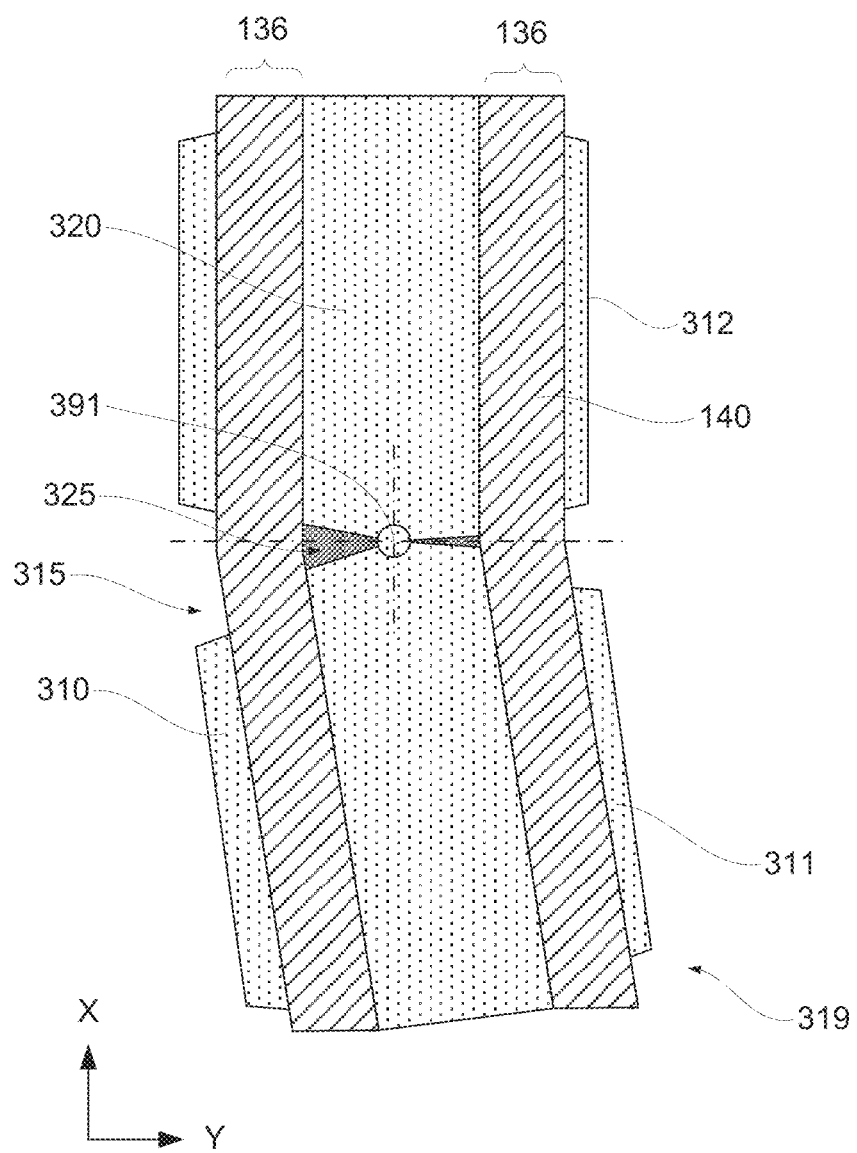
FIG. 5C is a schematic top view showing a die and a doe openings, allowing bending of the die, in accordance with some examples of the present disclosure.

In some examples, die 320 comprises die rotation openings 325 positioned at pivot points, e.g., as shown in FIG. 5C. Die rotation openings 325 allow die 320 to bend while plurality of pallet portions 319 rotates relative to each other (e.g., in plane and/or out of plane), In some examples, die 320 bends without distorting the structure of die 320. In some examples, die 320 is formed from a bendable material providing additional flexibility. The location of die rotation openings 325 corresponds to the location of pallet rotation openings 315 as, for example, is schematically shown in FIG. 5C. In some examples, die 320 is formed from a bendable material and does not include die rotation openings 325.

Method Examples

Figure 2A:
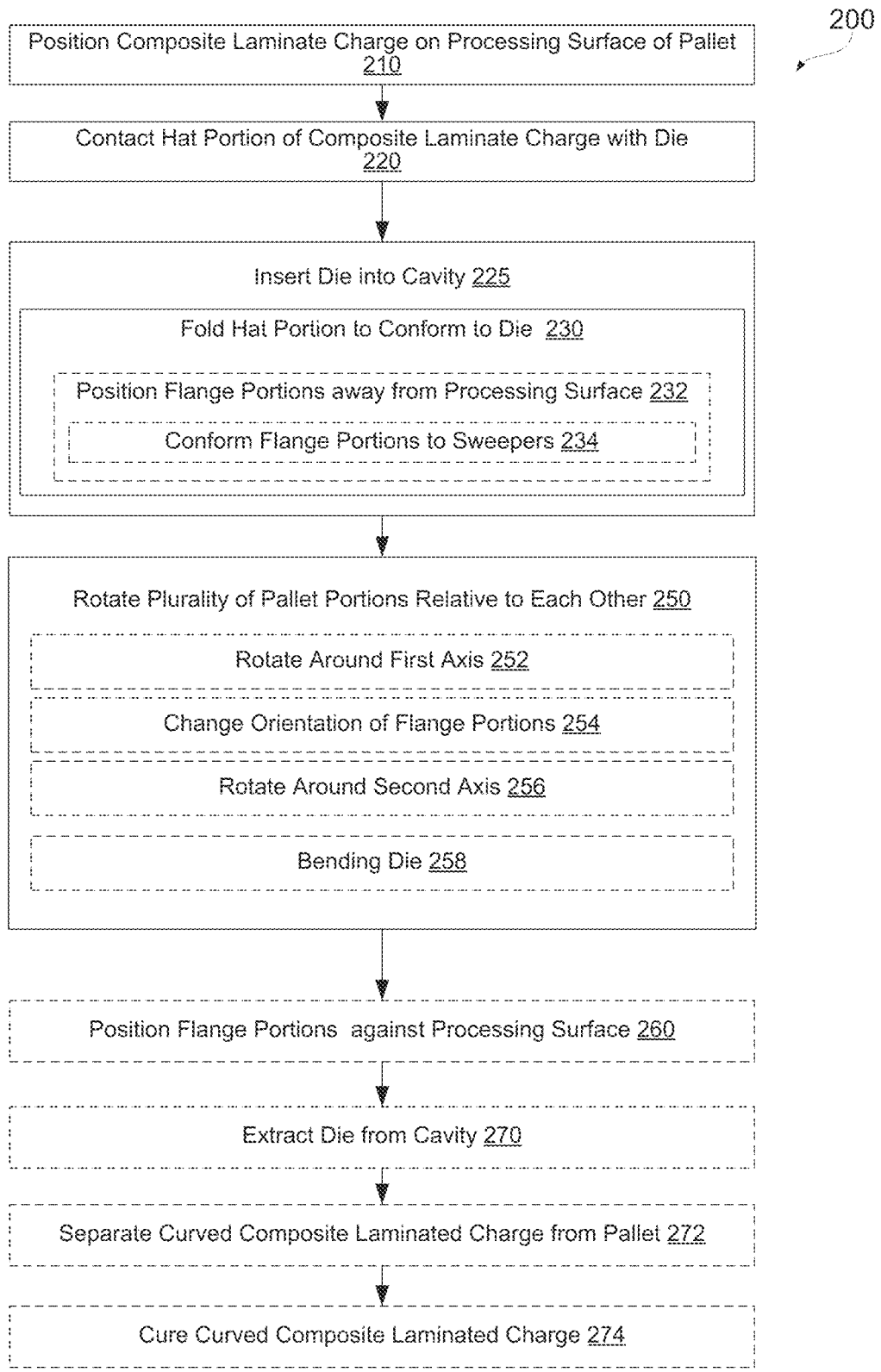
FIG. 2A is a process flowchart corresponding to a method for forming a curved composite charge with in-plane and/or out-of-plane bends, in accordance with some examples of the present disclosure.

FIG. 2A is a process flowchart corresponding to method 200 for forming a curved composite charge for stringer 110 with at least an in-plane bend or an out-of-plane bend, in accordance with some examples. In some examples, the curved composite charge and corresponding stringer 110 both in-plane and out-of-plane bends. Furthermore, stringer 110 may have any number of in-plane bends and/or out-of-plane bends.

Operations of method 200 are performed using stringer forming device 300, various examples of which are described above, e.g., with reference to FIG. 4A. In general, stringer forming device 300 comprises pallet 310 and die 320. Pallet 310, in turn, comprises plurality of pallet portions 319 such that each pallet portion of plurality of pallet portions 319 is rotatably coupled to at least one other of plurality of pallet portions 319. Pallet 310 comprises cavity 318, which extends through each pallet portion of plurality of pallet portions 3:19. Cavity 3:18 is defined by cavity surface 317.

Figure 3A:
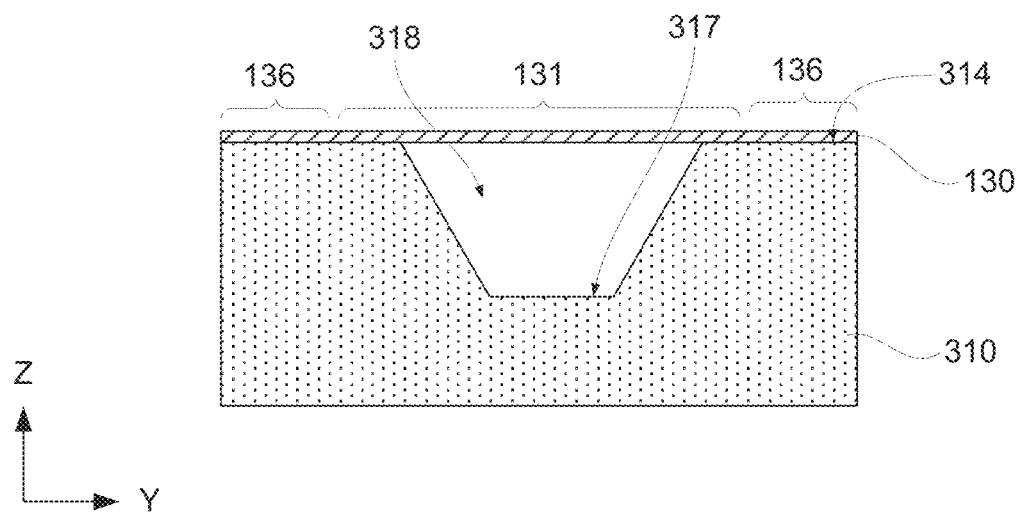
FIG. 3A is a schematic cross-sectional view of a pallet with a composite charge, positioned over the processing surface of the pallet, in accordance with some examples of the present disclosure.

In some examples, method 200 commences with positioning (block 210 in FIG. 2A) composite charge 130 on processing surface 3:14 of pallet 310. More specifically, composite charge 130 is positioned over cavity 318 of pallet 3:10 as, for example, is schematically shown in FIG. 3A. Furthermore, composite charge 130 is positioned over and contacts each pallet portion of plurality of pallet portions 319.

In general, any examples of composite charge 130, suitable for forming stringer 110, are within the scope of the present disclosure. For example, composite charge 130 comprises an uncured pre-impregnated reinforcing tape or fabric, which may be referred to as a prepreg. The tape or fabric comprises fibers, such as graphite fibers, embedded within a matrix material, such as a polymer or, more specifically, an epoxy or phenolic resin. In some examples, the tape or fabric is unidirectional or woven depending on the design and the degree of reinforcement desired in the resulting composite stringer.

Figure 3B:
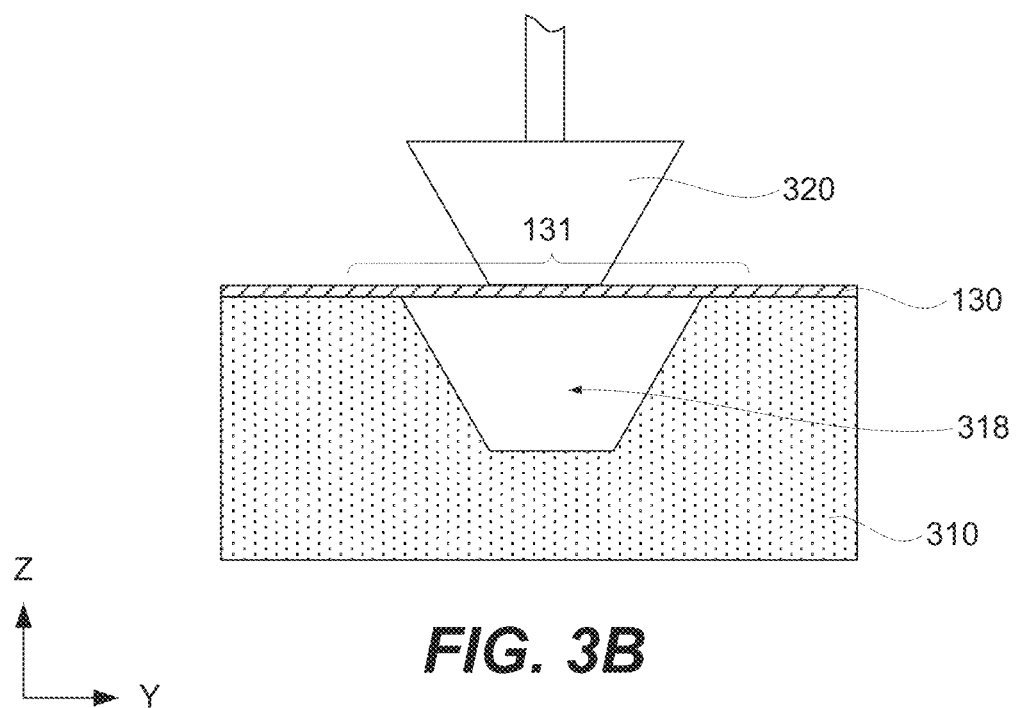
FIG. 3B is a schematic cross-sectional view of the pallet and the composite charge of FIG. 3A, further illustrating a die, aligned with the cavity of the pallet and contacting the composite charge, in accordance with some examples of the present disclosure.
Figure 3C:
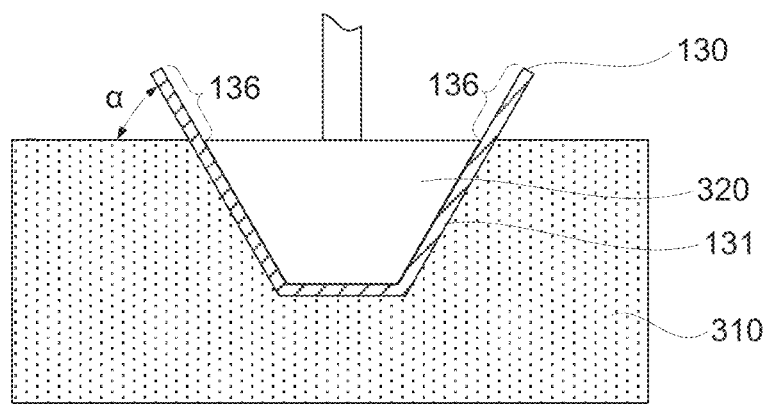
FIG. 3C is a schematic cross-sectional view of the pallet and the die of FIG. 3B, with the die inserted into the cavity and forming a hat portion of the composite charge, in accordance with some examples of the present disclosure.

Referring to FIGS. 3A-C, composite charge 130 comprises hat portion 131 and flange portions 136, monolithic with and interconnected by hat portion 131. Hat portion 131 is converted into a stringer hat portion, when composite charge 130 is shaped. In some examples, the shape of flange portions 136 remains substantially unchanged (e.g., remain co-planar) when composite charge 130 is shaped. In some examples, composite charge 130 is substantially straight/planar, at least at this stage of the overall process.

Referring to FIG. 2A, method 200 proceeds with contacting hat portion 131 of composite charge 130 with die 320 (block 220). During this operation, die 320 is aligned with cavity 318 as, for example, is schematically shown in FIG. 3B. It should be noted that at this stage, neither hat portion 131 nor die 320 protrude into cavity. Furthermore, flange portions 136 remains in compact with processing surface 314 of pallet 310.

Figure 3D:
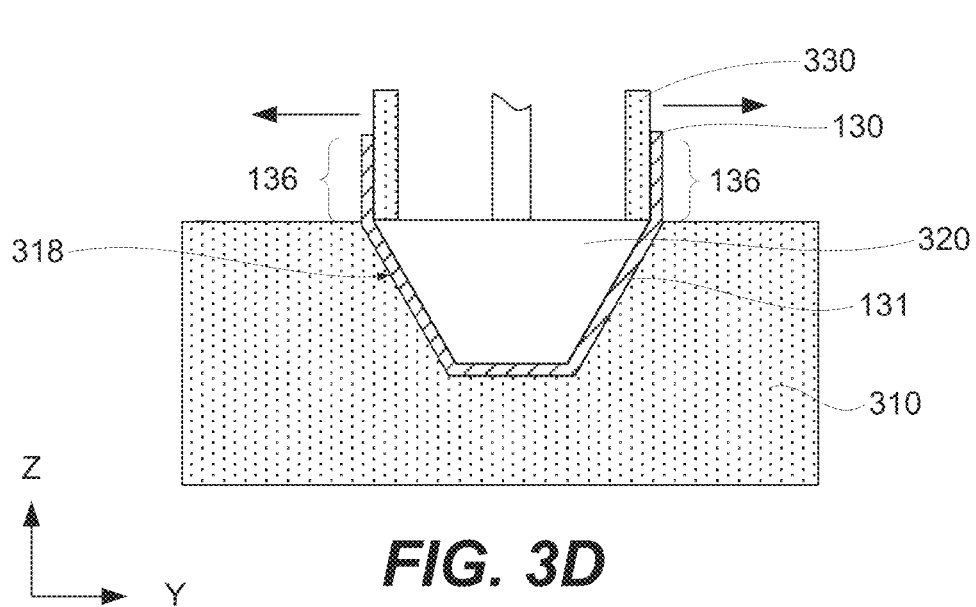
FIG. 3D is a schematic cross-sectional view of a pallet and a die, with flange portions of a charge conforming to die sweepers, positioned above the die, in accordance with some examples of the present disclosure.

Referring to FIG. 2A, method 200 proceeds with inserting die 320 into cavity 318 (block 225). This die insertion operation comprises folding at least hat portion 131 to conform to die 320 (block 230) as, for example, is schematically shown in FIGS. 3C and 3D. At this stage, hat portion 131 is compressed between die 320 and the surface of pallet 310, forming cavity 318. In this example, operations represented by block 230 and block 225 overlap. Alternatively, operations represented by block 230 and block 225 are performed at different times. For example, hat portion 131 is folded to conform to die 320, e.g., using another device, before die 320 is inserted into cavity 318

In some examples, the folding operation (block 230) comprises positioning flange portions 136 away from processing surface 314 (block 232) as, e.g., is schematically shown in FIG. 3C. Various techniques are within the scope.

Figure 3E:
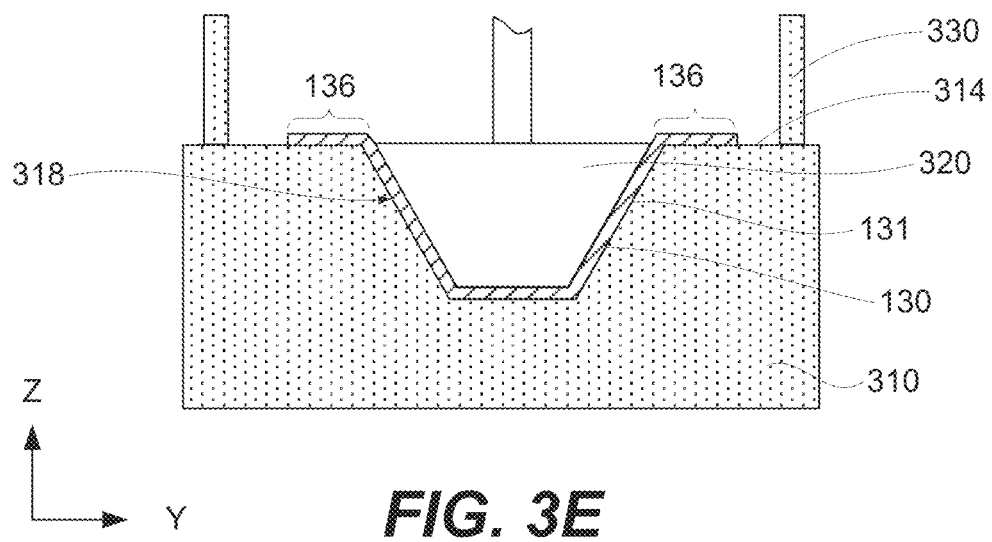
FIG. 3E is a schematic cross-sectional view of the pallet and the die of FIG. 3D, after the flange portions have been pushed by the die sweepers against the processing surface of the pallet, in accordance with some examples of the present disclosure.

For example, an edge may be slid over processing surface 314 to lift flange portions 136. In more specific examples, flange portions 136 are conformed to sweepers 330 (block 234) as, e.g., is schematically shown in FIG. 3D, It should be noted that flange portions 136 are positioned away from processing surface 314 either before, after, or while die 320 is inserted into cavity 318, During later operations, e.g., after rotating two or more pallet portions of plurality of pallet portions 319 relative to each other, flange portions 136 are pushed against processing surface 314 by sweepers 330 as, e.g., is schematically shown in FIG. 3E.

Various orientation of flange portions 136 relative to processing surface 314 within the scope. For example, the angle (a) between each of flange portions 136 and processing surface 314 is between 45° and 90°. This angle depends, in some examples, on the degree of in-plane bends that composite charge 130 with be subjected. In some examples, lifting flange portions 136 away from processing surface 314 is performed prior to bending composite charge 130. In some examples, flange portions 136 are conformed to sweepers 330, positioned over die 320, as, e.g., is schematically shown in FIG. 3D.

In some examples, the folding operation (block 230) is independent from the inserting operation (block 225). For example, hat portion 131 is formed, at least partially, prior to inserting die 320 into cavity 318, e.g., using other forming tools.

Referring to FIG. 2A, method 200 proceeds with rotating two or more pallet portions of plurality of pallet portions 319 relative to each other (block 250). The rotation is performed around one or more axes 390, as further described below. This rotation operation forms curved composite charge 140. It should be noted that, in some examples, the two or more pallet portions of plurality of pallet portions 319 are rotated relative to each other while die 320 remains inserted into cavity 318, which causes die 320 to bend as further described below with reference to block 258. Die 320 provides support at least to hat portion 131 during this rotation operation.

Examples of one or more axes 390 are shown in FIG. 4A and identified as first axis 391, second axis 392, and third axis 393, Specifically, plurality of pallet portions 319 comprises first pallet portion 311 and second pallet portion 312, rotatably coupled to each other. In some examples, first pallet portion 311 and second pallet portion 312 are rotated, relative to each other, around first axis 391 (block 252). This example may be referred to as in-plane rotation, since first pallet portion 311 is perpendicular to processing surface 314 of pallet 310, as, for example, is schematically shown in FIGS. 4C and 4D. FIG. 4A illustrates flange portions 136 positioned away from processing surface 314, which simplifies the rotation around first axis 391 and reduces the risk of wrinkles.

In some examples, first pallet portion 311 and second pallet portion 312 are rotated, relative to each other, around second axis 392 (block 256). This example may be referred to as out-of-plane rotation, since second axis 392 is parallel to processing surface 314 of pallet 310 and schematically shown in FIGS. 6A and 6B. The rotation around second axis 392 does not require flange portions 136 being positioned away from processing surface 314, similar to the in-plane rotation described above. In some examples, this type of rotation is performed with flange portions 136 contacting processing surface 314. As such, method 200 or, more specifically, the pallet rotation operation (block 250) comprises, in some examples, changing the orientation of flange portions 136 (block 254).

Figure 4B:
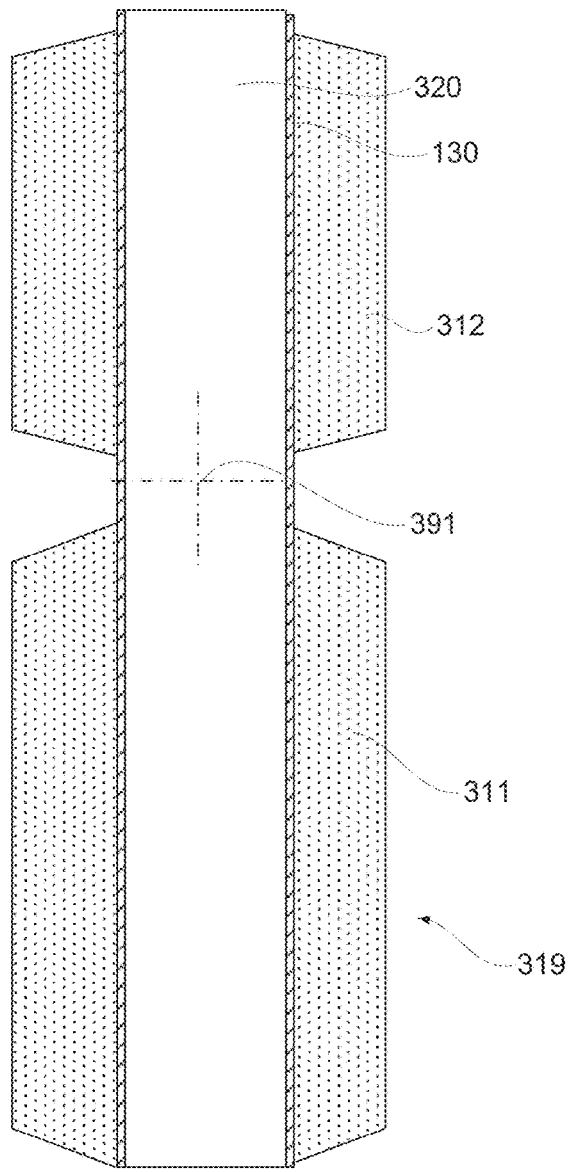
FIGS. 4B and 4C are a schematic top view of a pallet and a composite charge, before and after rotating the plurality of pallet portions relative to each other, in accordance with some examples of the present disclosure.
Figure 4C:
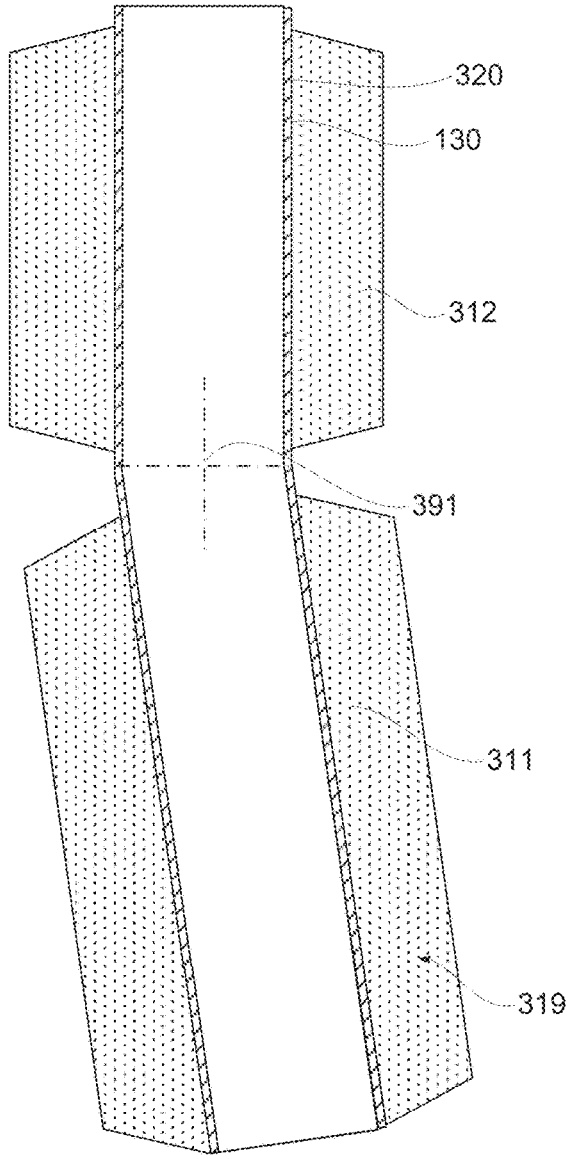
Figure 6A:
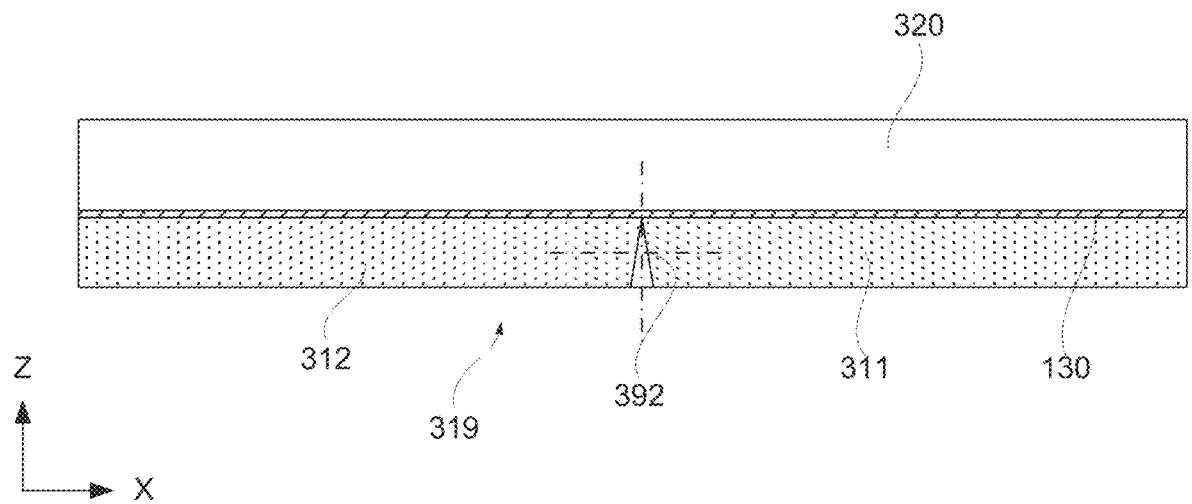
FIGS. 6A and 6B are schematic side views of a pallet, a composite charge, and a die, before and after rotating the plurality of pallet portions relative to each other, in accordance with some examples of the present disclosure.
Figure 6B:
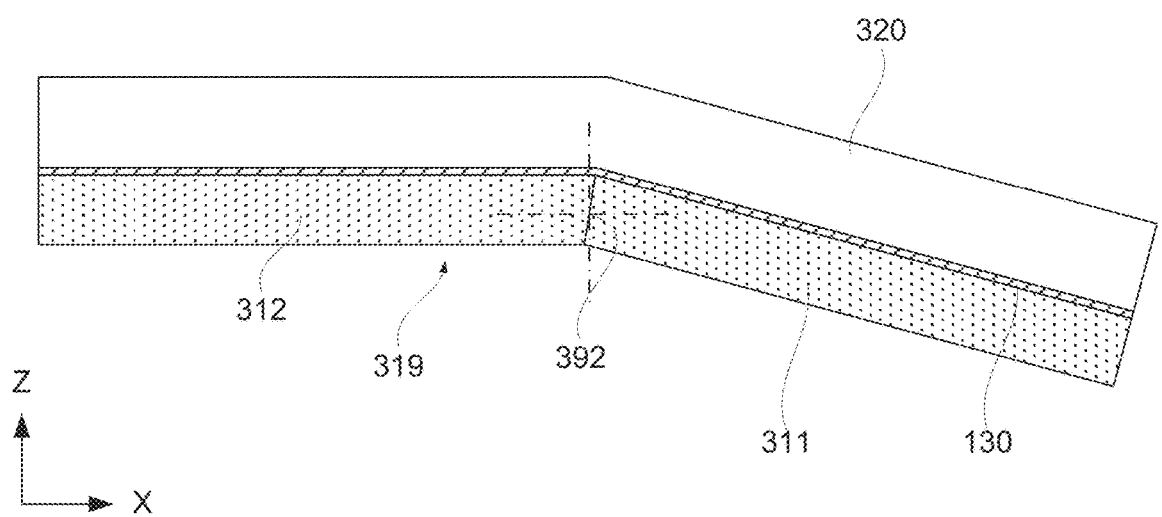

In some examples, first pallet portion 311 and second pallet portion 312 are rotated, relative to each other, around both first axis 391 and second axis 392 as shown in FIGS. 4B and 4C and also in FIGS. 6A and 6B. For examples, these pallet portions 319 are rotated (relative to each other) first around first axis 391, prior to being rotated around second axis 392. More specifically, in some examples, once the rotation around first axis 391 is completed and before the rotation around second axis 392 is initiated, method 200 comprises changing orientation of flange portions 136 relative to processing surface 314, e.g., positioning flange portions 136 against processing surface 314. Alternatively, these pallet portions are rotated (relative to each other) simultaneously around first axis 391 and around second axis 392.

In some examples, two or more pallet portions of plurality of pallet portions 319 are rotated relative to each other after die 320 is inserted into cavity 318 and hat portion 131 is positioned between die 320 and cavity surface 317. In other words, the rotating operation (block 250) also involves bending die 320 (block 258). As further described below, die 320 is bendable and allows supporting hat portion 131 while plurality of pallet portions rotated.

In some examples, the operations represented by block 225 and block 250 in FIG. 2A, overlap in time. Specifically, two or more pallet portions of plurality of pallet portions 319 are rotated relative to each other while die 320 is being inserted into cavity 318, More specifically, various processing parameters associated with the inserting operation (block 225) and also with the bending operation (block 250) are dynamically controlled. For example, the starting time of each operation, the speed of each operation, and/or other like parameters are varies during operation. More specifically, the rotating speed with which two or more pallet portions of plurality of pallet portions 319 being rotated relative to each other and an inserting speed of die 320 being inserted into cavity 318 are dynamically controlled.

In some examples, at least two pallet portions of plurality of pallet portions 319 have different lengths as, for example, is schematically shown in FIGS. 4B and 4C. For example, the length of each pallet portion depends on the required curvature of stringer 110, e.g., the distance between adjacent bend points. In some examples, pallet 310 is a highly-articulated pallet formed from short pallet portions such that any two adjacent pallet portions are able to rotate relative to each other around at least two axes.

In some examples, processing surface 314 of pallet 310 comprises one or more cutouts between each adjacent pair of plurality of pallet portions 319. One or more cutouts allow rotating (block 250) two or more pallet portions of plurality of pallet portions 319 relative to each other. These cutouts are schematically shown in FIGS. 4A-4C for in-plate rotations and in FIG. 6A for out-of-plane rotations.

In some examples, e.g., when flange portions 136 have been previously positioned away from processing surface 314, method 200 further comprises positioning flange portions 136 against processing surface 314 (block 260). Flange portions 136 positioned against processing surface 314 are schematically shown in FIG. 3E as well as FIGS. 5A and 5B. This operation is performed after two or more pallet portions of plurality of pallet portions 319 have been rotated relative to each other.

In some examples, this flange positioning operation (block 260) comprises sweeping flange portions 136 with sweepers 330 as, for example, schematically shown in FIGS.

3D and 3E. Specifically, sweepers 330 are moved away from die 320, forcing flange portions 136 against processing surface 314.

In some examples, this flange positioning operation (block 260) comprises inflating bladders 340, positioned between processing surface 314 and containment plate 350 as, for example, is schematically shown in FIG. 5A. As bladders 340 are inflated, bladders 340 increase in size and force flange portions 136 against processing surface 314. Furthermore, in some examples, containment plate 350 is moved down toward pallet 310. In these examples, bladders 340 pressurize and compact flange portions 136.

Referring to FIG. 5B, in some examples, containment plate 350 comprises plate rotation openings 355 positioned at pivot points. Plate rotation openings 355 allow containment plate 350 to bend while plurality of pallet portions 319 rotates relative to each other (e.g., in plane and/or out of plane). In some examples, containment plate 350 bends without distorting the structure of containment plate 350. In some examples, containment plate 350 is formed from a bendable material providing additional flexibility. The location of plate rotation openings 355 corresponds to the location of pallet rotation openings 315 as, for example, is schematically shown in FIG. 5B, In some example, respective sweepers 330 are coupled to respective containment plates 350, and thus in such an example the sweepers 330 are also configured to rotate relative to each other.

In some examples, method 200 further comprises extracting die 320 from cavity 318 (block 270), separating curved composite charge 140 from pallet 310 (block 272), and curing curved composite charge 140 thereby forming stringer 110 (block 274).

Figure 2B:
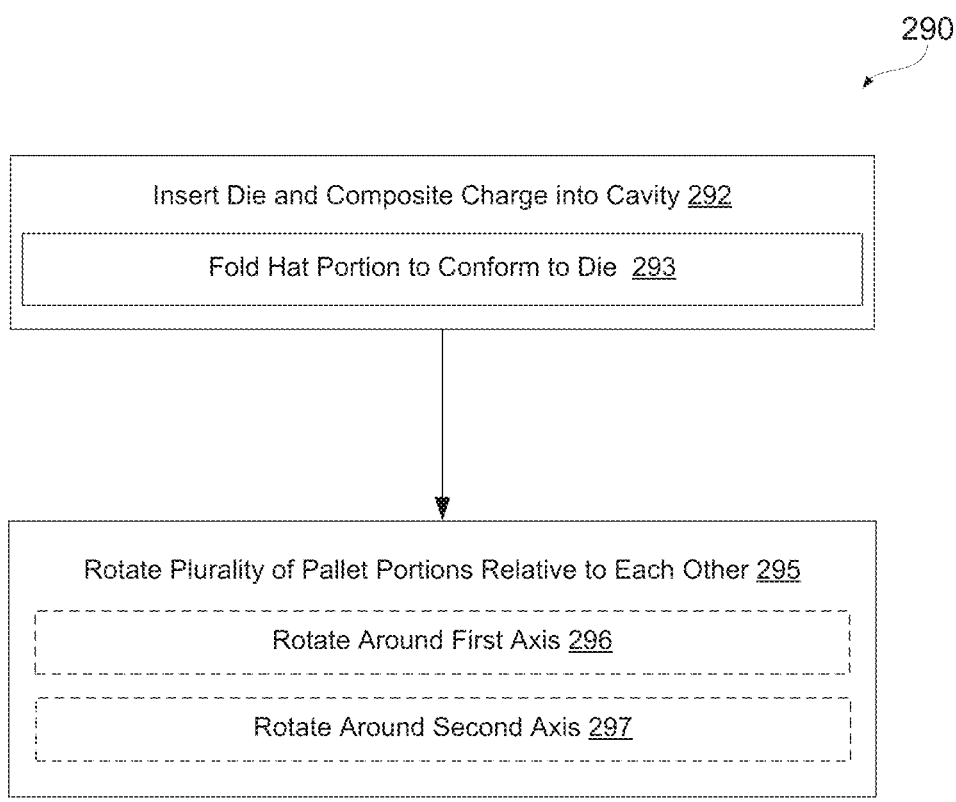
FIG. 2B is a process flowchart corresponding to another example of a method for forming a curved composite charge with in-plane and/or out-of-plane bends, in accordance with some examples of the present disclosure.

FIG. 2B is a process flowchart corresponding to another example of a method for forming a curved composite charge with in-plane and/or out-of-plane bends. This example may be referred to as method 290 and is similar in some respects to method 200 (shown in FIG. 2A). Thus, method 290 is described in a general context and with reference to method 200. It should be explicitly noted, however, that in examples any possibilities and permutations described above with respect to method 200 may equally apply to method 290.

Method 290 comprises inserting (block 292) die 320 and composite charge (e.g., composite charge 130) into cavity 318 of pallet 310. As described above, pallet 310 comprises plurality of pallet portions 319, rotatably coupled to each other. Method 290 further comprises rotating (block 295) two or more pallet portions of plurality of pallet portions 319 relative to each other around one or more axes 390, thereby forming a curved composite charge 140 from the composite charge 130.

Within examples, inserting die 320 and composite charge 130 into cavity 130 involves folding (block 293) hat portion 131 of composite charge 130 by inserting the die 320 into the cavity 130.

Within examples, the rotating includes rotating the two or more pallet portions of the plurality of pallet portions 319 relative to each other around first axis 391 (block 296) and/or rotating the two or more pallet portions of the plurality of pallet portions (319) relative to each other around second axis 392 (block 297).

Within examples of method 290, flange portions 136 of composite charge 130 are positioned away from plurality of pallet portions 319 while the two or more pallet portions of plurality of pallet portions 319 are rotated relative to each other.

Within examples of method 290, the two or more pallet portions of plurality of pallet portions 319 are rotated relative to each other while die 320 is being inserted into cavity 318.

Within examples of method 290, the two or more pallet portions of plurality of pallet portions 319 are rotated relative after die 320 is being inserted into cavity 318.

Within examples of method 290, rotating the two or more pallet portions of plurality of pallet portions 319 relative to each other comprises bending die 320, while die 320 is being inserted into cavity 318.

Aircraft Examples

In some examples, methods and systems described above are used on aircraft and, more generally, by the aerospace industry. Specifically, these methods and systems can be used during fabrication of aircraft as well as during aircraft service and maintenance.

Figure 7:
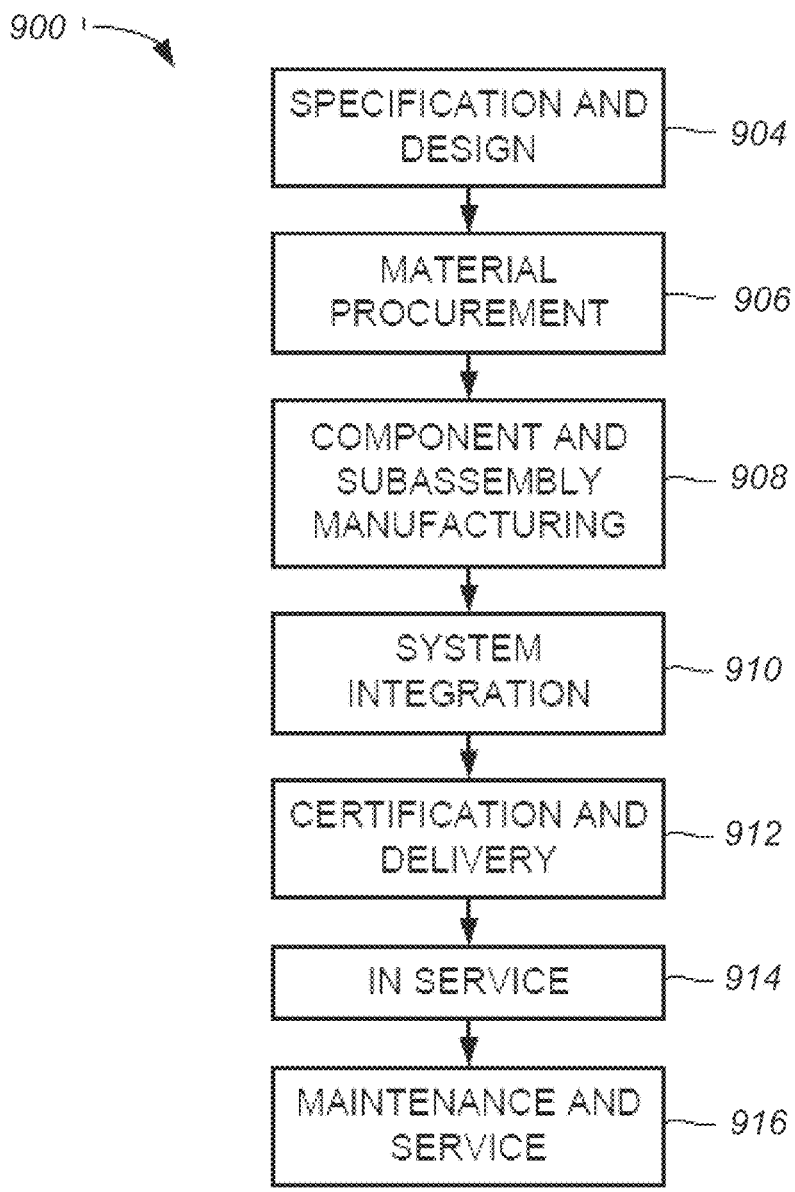
FIG. 7 is a process flowchart corresponding to a method for manufacturing and service the aircraft.
Figure 8:
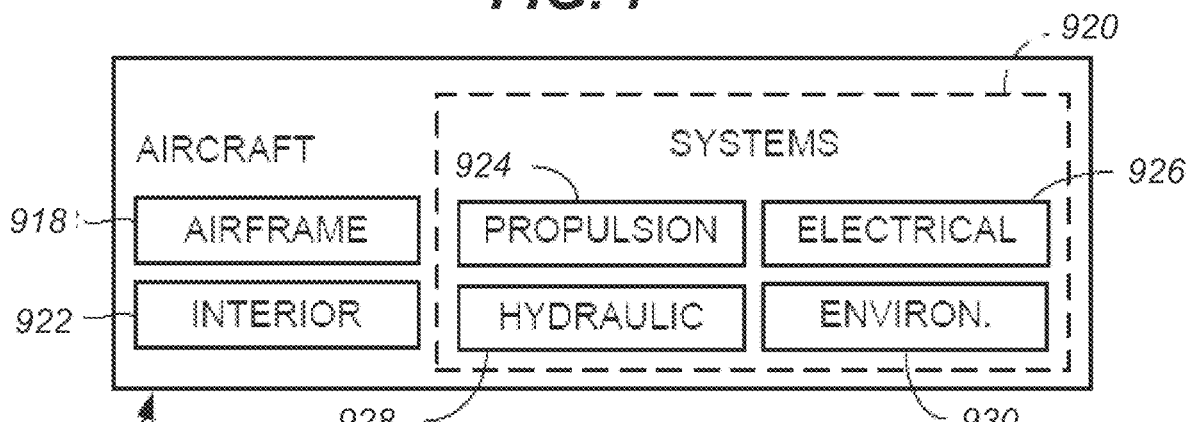
FIG. 8 illustrates a block diagram of an example of an aircraft, in accordance with some examples of the present disclosure.

Accordingly, the apparatus and methods described above are applicable for aircraft manufacturing and service method 900 as shown in FIG. 7 and for aircraft 902 as shown in FIG. 8. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of venders, subcontractors, and suppliers; and an operator can be an airline, leasing company, military entity, service organization, and so on.

As shown in FIG. 8, aircraft 902 produced by method 900 includes airframe 918 with plurality of systems 920, and interior 922. Examples of systems 920 include one or more of propulsion system 924, electrical system 926, hydraulic system 928, and environmental system 930. Any number of other systems can be included. Although an aerospace example is shown, the principles of the examples described herein is applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof is utilized during manufacturing 908 and system integration 910, for example, by substantially expediting assembly of or reducing the cost of an aircraft 902. Similarly, one or more of apparatus examples, method examples, or a combination thereof is utilized while aircraft 902 is in service, for example and without limitation, to maintenance and service 916.

Further Examples

Further, description includes examples according to following clauses:

Clause 1. A method for forming a curved composite charge, the method comprising:
positioning a composite charge on a processing surface of a pallet and over a cavity of the pallet, wherein:
the composite charge comprises a hat portion and flange portions, monolithic with and interconnected by the hat portion, and
the pallet comprises a plurality of pallet portions, wherein each pallet portion of the plurality of pallet portions is rotatably coupled to at least one other pallet portion of the plurality of pallet portions,
the cavity extends through each pallet portion of the plurality of pallet portions, and
the composite charge is positioned over and contacts, each pallet portion of the plurality of pallet portions;
contacting the hat portion of the composite charge with a die such that the die is aligned with the cavity, the cavity is defined by a cavity surface;
folding at least the hat portion to conform to the die;
inserting the die into the cavity such that the hat portion is positioned between the die and the cavity surface and conforms to each of the die and the cavity surface; and
rotating two or more pallet portions of the plurality of pallet portions relative to each other around one or more axes, thereby forming a curved composite charge.

Clause 2. The method of clause 1, wherein the flange portions are positioned away from the processing surface of the pallet while the two or more pallet portions of the plurality of pallet portions are rotated relative to each other.

Clause 3. The method of clause 2, wherein folding at least the hat portion comprises positioning the flange portions away from the processing surface.

Clause 4. The method of clause 3, wherein positioning the flange portions away from the processing surface comprises conforming the flange portions to sweepers, positioned over the die.

Clause 5. The method of clause 2, further comprising, after two or more pallet portions of the plurality of pallet portions are rotated relative to each other, positioning the flange portions against the processing surface.

Clause 6. The method of clause 5, wherein positioning the flange portions against the processing surface comprises at least one of:
sweeping the flange portions with sweepers, positioned over the die,
inflating bladders, positioned between the processing surface and a containment plate, or
forcing the flange portions against the processing surface using the containment plate.

Clause 7. The method of any one of clauses 1-6, wherein the one or more axes comprises a first axis, perpendicular to the processing surface of the pallet.

Clause 8. The method of any one of clauses 1-7, wherein the one or more axes comprises a second axis, parallel to the processing surface of the pallet.

Clause 9. The method of any one of clauses 1-8, wherein:
the one or more axes comprises a first axis and a second axis,
the first axis is perpendicular to the processing surface of the pallet,
the second axis is parallel to the processing surface of the pallet, the method further comprises rotating the two or more pallet portions of the plurality of pallet portions relative to each other around the first axis and the second axis.

Clause 10. The method of clause 9, wherein the two or more pallet portions of the plurality of pallet portions are rotated relative to each other around the first axis prior to being rotated around the second axis.

Clause 11. The method of clause 9, wherein the two or more pallet portions of the plurality of pallet portions are rotated relative to each other simultaneously around the first axis and around the second axis.

Clause 12. The method of clause 9, further comprising, after the two or more pallet portions of the plurality of pallet portions are rotated relative to each other around the first axis and prior to being rotated around the second axis, changing orientation of the flange portions relative to the processing surface.

Clause 13. The method of any one of clauses 1-12, further comprising:
extracting the die from the cavity;
separating the curved composite charge from the pallet; and
curing the curved composite charge thereby forming a stringer.

Clause 14. The method of any one of clauses 1-13, wherein the two or more pallet portions of the plurality of pallet portions are rotated relative to each other after the die is inserted into the cavity and the hat portion is positioned between the die and the cavity surface.

Clause 15. The method of any one of clauses 1-14, wherein the two or more pallet portions of the plurality of pallet portions are rotated relative to each other while the die is being inserted into the cavity.

Clause 16. The method of clause 15, wherein a rotating speed with which the two or more pallet portions of the plurality of pallet portions being rotated relative to each other and an inserting speed of the die being inserted into the cavity are dynamically controlled.

Clause 17. The method of any one of clauses 1-16, wherein at least two of the plurality of pallet portions have different lengths.

Clause 18. The method of any one of clauses 1-17, wherein rotating two or more pallet portions of the plurality of pallet portions relative to each other comprises bending the die, while the die is being inserted into the cavity.

Clause 19. The method of any one of clauses 1-18, wherein:
the processing surface of the pallet comprises one or more cutouts between each adjacent pair of the plurality of pallet portions, and
the one or more cutouts allow rotating two or more pallet portions of the plurality of pallet portions relative to each other.

Clause 20. The method of any one of clauses 1-1% wherein rotating two or more pallet portions of the plurality of pallet portions relative to each other is performed while the flange portions are positioned against the processing surface.

Clause 21. A method comprising:
inserting a die and a composite charge into a cavity of a pallet, wherein the pallet comprises a plurality of pallet portions, rotatably coupled to each other; and
rotating two or more pallet portions of the plurality of pallet portions relative to each other around one or more axes, thereby forming a curved composite charge from the composite charge.

Clause 22. The method of clause 21, wherein flange portions of the composite charge are positioned away from the plurality of pallet portions while the two or more pallet portions of the plurality of pallet portions are rotated relative to each other.

Clause 23. The method of any one of clauses 21-22, wherein the two or more pallet portions of the plurality of pallet portions are rotated relative to each other while the die is being inserted into the cavity.

Clause 24. The method of any one of clauses 21-23, wherein the two or more pallet portions of the plurality of pallet portions are rotated relative after the die is being inserted into the cavity.

Clause 25. The method of clause 24, wherein rotating two or more pallet portions of the plurality of pallet portions relative to each other comprises bending the die, while the die is being inserted into the cavity.

Clause 26. A stringer forming device comprising:
a pallet, comprising a plurality of pallet portions,
wherein each pallet portion of the plurality of pallet portions is rotatably coupled to at least one other pallet portion of the plurality of pallet portions, and
wherein the pallet further comprises a processing surface and a cavity, extending away from the processing surface and into the pallet; and
a die, aligned with the cavity and having a cross-section corresponding to a cross-section of the cavity, wherein the die is movable relative to the pallet in a direction, perpendicular to the processing surface of the pallet.

Clause 27. The stringer forming device of clause 26, wherein the die is bendable, when the die is inserted into the cavity and when the plurality of pallet portions rotate relative to each other.

Clause 28. The stringer forming device of any one of clauses 26-27, wherein the plurality of pallet portions are rotatable relative to each other around one or more axes, comprising a first axis, perpendicular to the processing surface of the pallet.

Clause 29. The stringer forming device of clause 28, wherein the plurality of pallet portions are rotatable relative to each other around one or more axes, comprising a second axis, parallel to the processing surface of the pallet.

Clause 30. The stringer forming device of any one of clauses 26-29, wherein the plurality of pallet portions are rotatable relative to each other around one or more axes, comprising a second axis, parallel to the processing surface of the pallet.

Clause 31. The stringer forming device of any one of clauses 26-30, further comprising sweepers, slidably coupled to the die and configured to slide in a direction, parallel to the processing surface.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method for forming a curved composite charge, the method comprising:
    positioning a composite charge on a processing surface of a pallet and over a cavity of the pallet, wherein:
        the composite charge comprises a hat portion and flange portions, monolithic with and interconnected by the hat portion, and
        the pallet comprises a plurality of pallet portions, wherein each pallet portion of the plurality of pallet portions is rotatably coupled to at least one other pallet portion of the plurality of pallet portions,
        the cavity extends through each pallet portion of the plurality of pallet portions, and
        the composite charge is positioned over and contacts, each pallet portion of the plurality of pallet portions;
    contacting the hat portion of the composite charge with a die such that the die is aligned with the cavity, the cavity is defined by a cavity surface;
    folding at least the hat portion to conform to the die;
    inserting the die into the cavity such that the hat portion is positioned between the die and the cavity surface and conforms to each of the die and the cavity surface; and
    rotating two or more pallet portions of the plurality of pallet portions relative to each other around one or more axes, thereby forming a curved composite charge.

2. The method of claim 1, wherein the flange portions are positioned away from the processing surface of the pallet while the two or more pallet portions of the plurality of pallet portions are rotated relative to each other.

3. The method of claim 2, wherein folding at least the hat portion comprises positioning the flange portions away from the processing surface.

4. The method of claim 3, wherein positioning the flange portions away from the processing surface comprises conforming the flange portions to sweepers, positioned over the die.

5. The method of claim 2, further comprising, after two or more pallet portions of the plurality of pallet portions are rotated relative to each other, positioning the flange portions against the processing surface.

6. The method of claim 5, wherein positioning the flange portions against the processing surface comprises at least one of:
    sweeping the flange portions with sweepers, positioned over the die,
    inflating bladders, positioned between the processing surface and a containment plate, or
    forcing the flange portions against the processing surface using the containment plate.

7. The method of claim 1, wherein the one or more axes comprises a first axis, perpendicular to the processing surface of the pallet.

8. The method of claim 1, wherein the one or more axes comprises a second axis, parallel to the processing surface of the pallet.

9. The method of claim 1, wherein:
    the one or more axes comprises a first axis and a second axis,
    the first axis is perpendicular to the processing surface of the pallet,
    the second axis is parallel to the processing surface of the pallet, the method further comprises rotating the two or more pallet portions of the plurality of pallet portions relative to each other around the first axis and the second axis.

10. The method of claim 9, wherein the two or more pallet portions of the plurality of pallet portions are rotated relative to each other around the first axis prior to being rotated around the second axis.

11. The method of claim 9, wherein the two or more pallet portions of the plurality of pallet portions are rotated relative to each other simultaneously around the first axis and around the second axis.

12. The method of claim 9, further comprising, after the two or more pallet portions of the plurality of pallet portions are rotated relative to each other around the first axis and prior to being rotated around the second axis, changing orientation of the flange portions relative to the processing surface.

13. The method of claim 1, further comprising: extracting the die from the cavity; separating the curved composite charge from the pallet; and curing the curved composite charge thereby forming a stringer.

14. The method of claim 1, wherein the two or more pallet portions of the plurality of pallet portions are rotated relative to each other after the die is inserted into the cavity and the hat portion is positioned between the die and the cavity surface.

15. The method of claim 1, wherein the two or more pallet portions of the plurality of pallet portions are rotated relative to each other while the die is being inserted into the cavity.

16. The method of claim 15, wherein a rotating speed with which the two or more pallet portions of the plurality of pallet portions being rotated relative to each other and an inserting speed of the die being inserted into the cavity are dynamically controlled.

17. The method of claim 1, wherein at least two of the plurality of pallet portions have different lengths.

18. The method of claim 1, wherein rotating two or more pallet portions of the plurality of pallet portions relative to each other comprises bending the die, while the die is being inserted into the cavity.

19. The method of claim 1, wherein: the processing surface of the pallet comprises one or more cutouts between each adjacent pair of the plurality of pallet portions, and the one or more cutouts allow rotating two or more pallet portions of the plurality of pallet portions relative to each other.

20. The method of claim 1, wherein rotating two or more pallet portions of the plurality of pallet portions relative to each other is performed while the flange portions are positioned against the processing surface.

* * * * *